(No Model.)  4 Sheets—Sheet 1.

A. F. DAVIS.
FODDER PREPARING APPARATUS.

No. 526,689.  Patented Oct. 2, 1894.

Witnesses:
L. C. Hills.
E. H. Bond.

Inventor:
Albert F. Davis,
By E. B. Stocking
Attorney.

(No Model.) 4 Sheets—Sheet 2.

A. F. DAVIS.
FODDER PREPARING APPARATUS.

No. 526,689. Patented Oct. 2, 1894.

Witnesses:
L. C. Hills.
E. H. Bond.

Inventor:
Albert F. Davis,
By E. B. Stocking
Attorney.

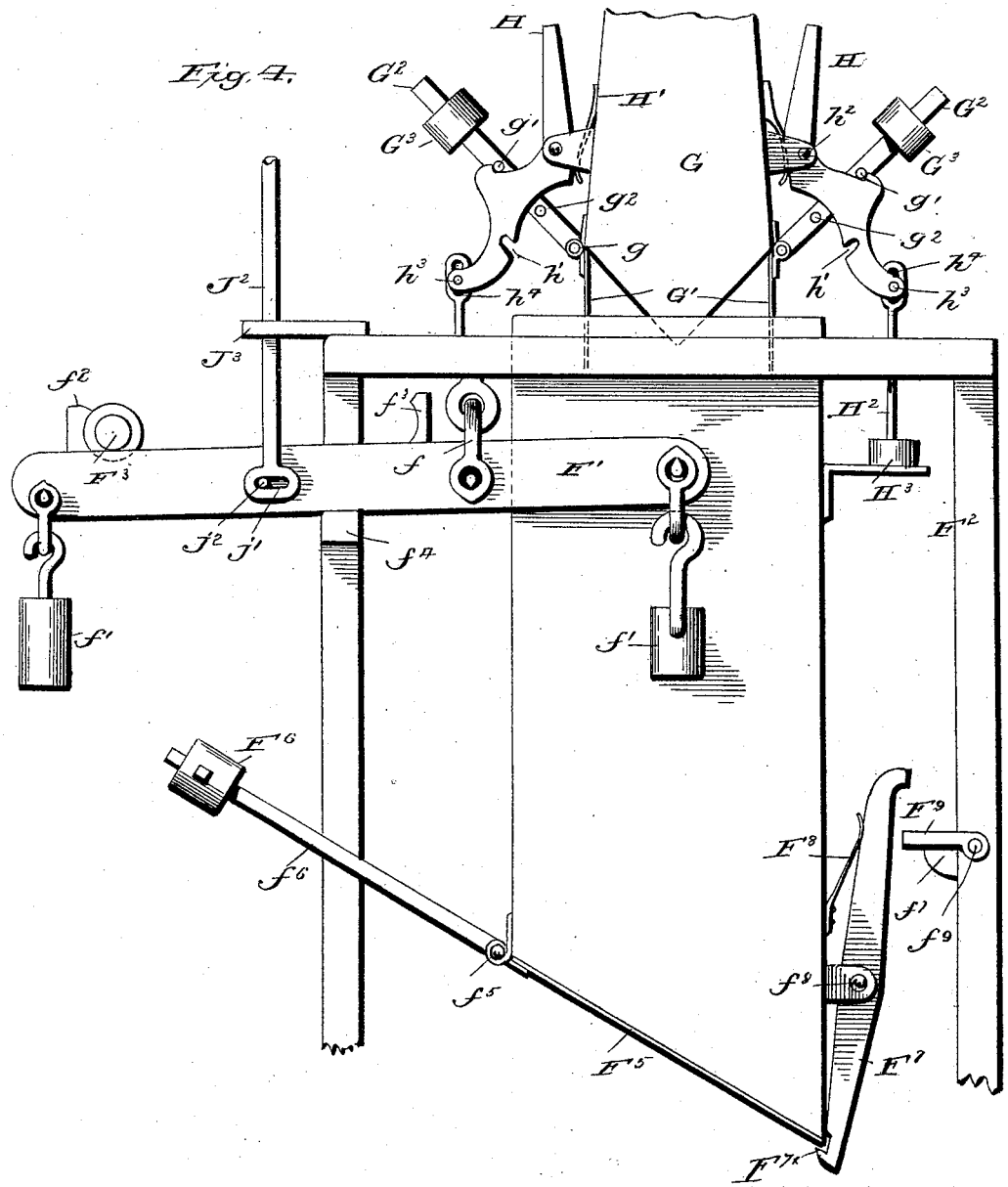

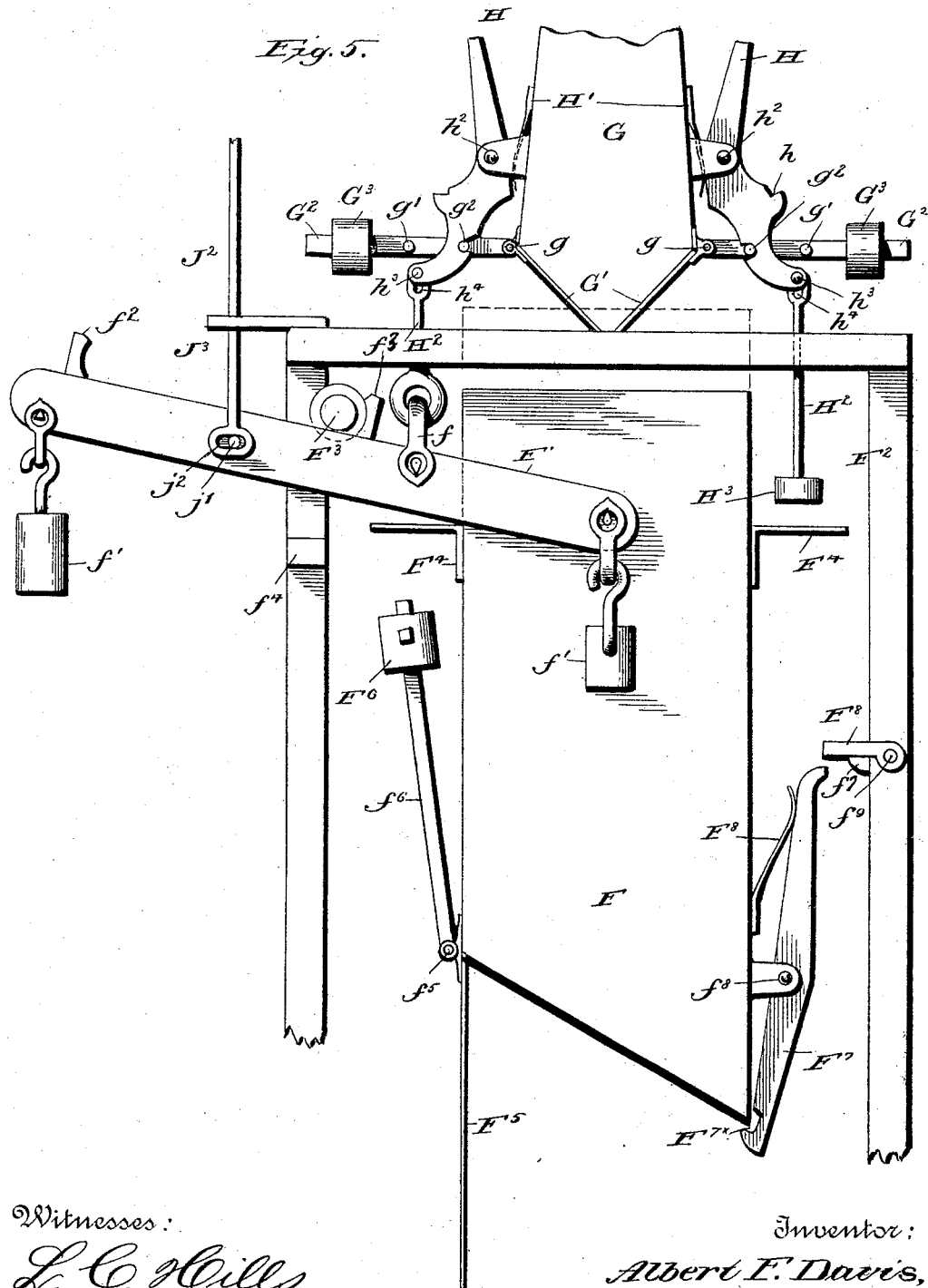

UNITED STATES PATENT OFFICE.

ALBERT F. DAVIS, OF RUTLAND, VERMONT.

FODDER-PREPARING APPARATUS.

SPECIFICATION forming part of Letters Patent No. 526,689, dated October 2, 1894.

Application filed October 7, 1893. Serial No. 487,479. (No model.)

*To all whom it may concern:*

Be it known that I, ALBERT F. DAVIS, a citizen of the United States, residing at Rutland, in the county of Rutland, State of Vermont, have invented certain new and useful Improvements in Fodder-Preparing Apparatus, of which the following is a specification, reference being had therein to the accompanying drawings.

This invention pertains to an apparatus or mechanism for preparing fodder and it has for its object among others to provide a simple, cheap and efficient machine for cutting, mixing together, grinding and weighing hay, straw, corn stalks or other material and grain in such proportions as may be desired and this preferably automatically. I provide means for operating upon the hay either baled or loose and disintegrating it and conveying it to a mill to which is supplied the grain in a desired quantity and where the hay and grain are ground and conveyed to a weighing box or receptacle which is automatically emptied when it has received a predetermined amount or weight and as the same is discharged therefrom it causes the weighing apparatus to be actuated to supply another quantity of the grain to the mill. The cut hay and the grain are discharged into a conveyer by which they are taken to the mill and which serves to mix them partially before they are ground. The weighing machine or apparatus controls the quantity of grain to be mixed with the hay and the admission of the feed to the weighing machine is automatically controlled by the discharge from the weigh box or receptacle. The parts being automatic in their action little or no attention on the part of the attendant is required. The weigh box or receptacle is suspended from a counter-balance lever and has provisions for supporting the weights of the devices which control the discharge from the grain-spout to the weigh-box.

Other objects and advantages of the invention will appear in the following description and the novel features thereof will be particularly pointed out in the appended claims.

The invention is clearly illustrated in the accompanying drawings, which with the letters of reference marked thereon form a part of this specification, and in which—

Figure 1:
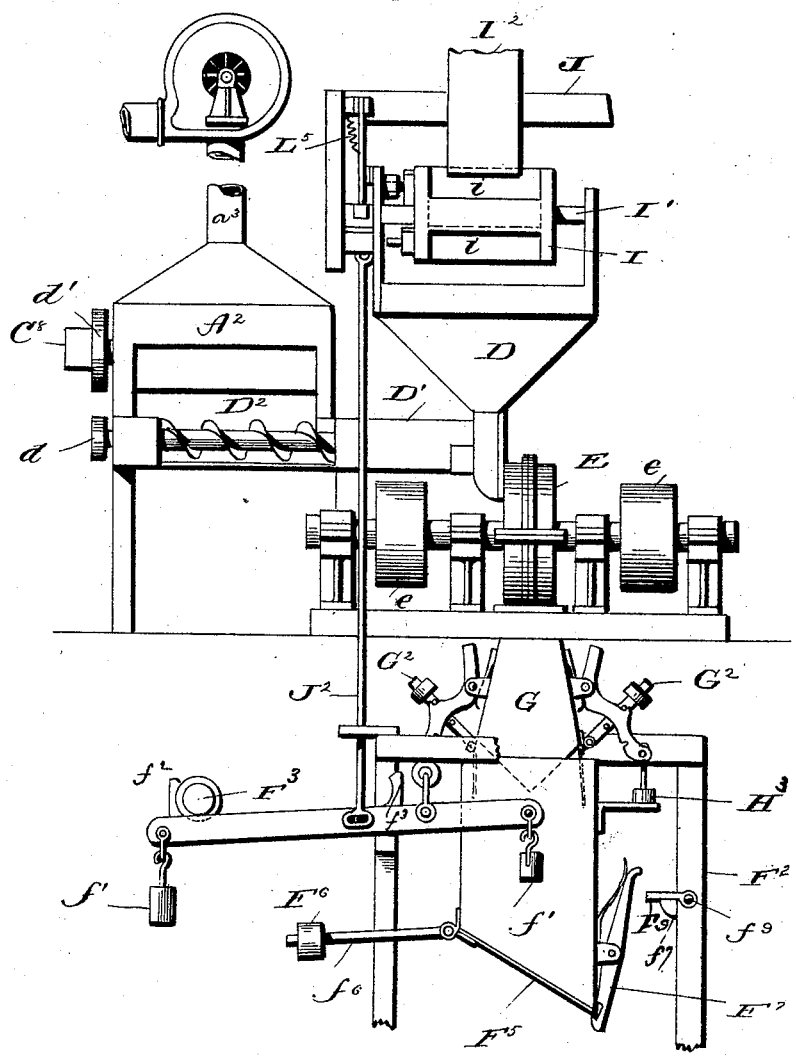
Figure 2:
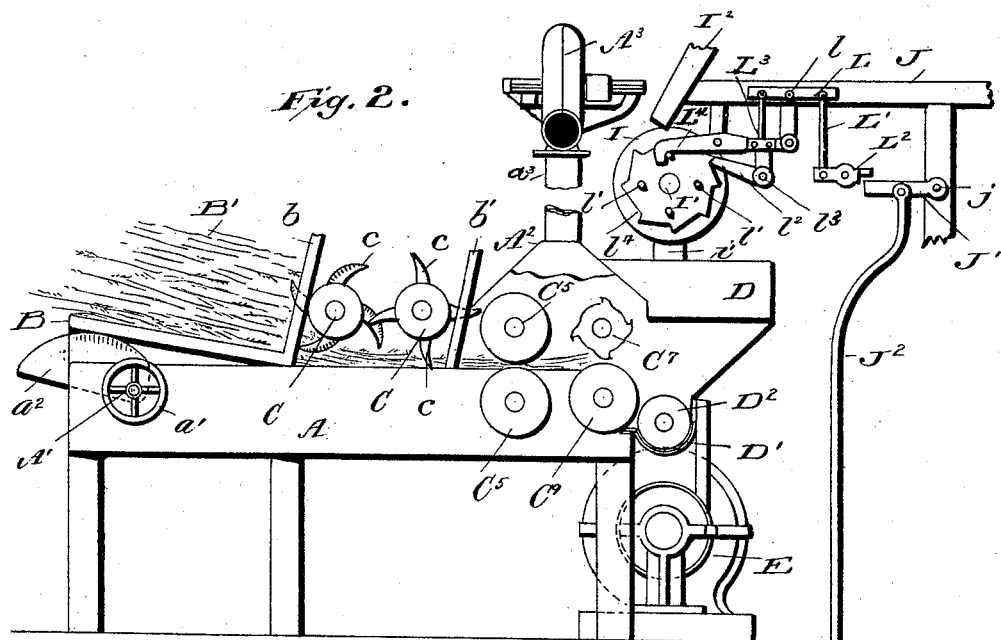
Figure 3:
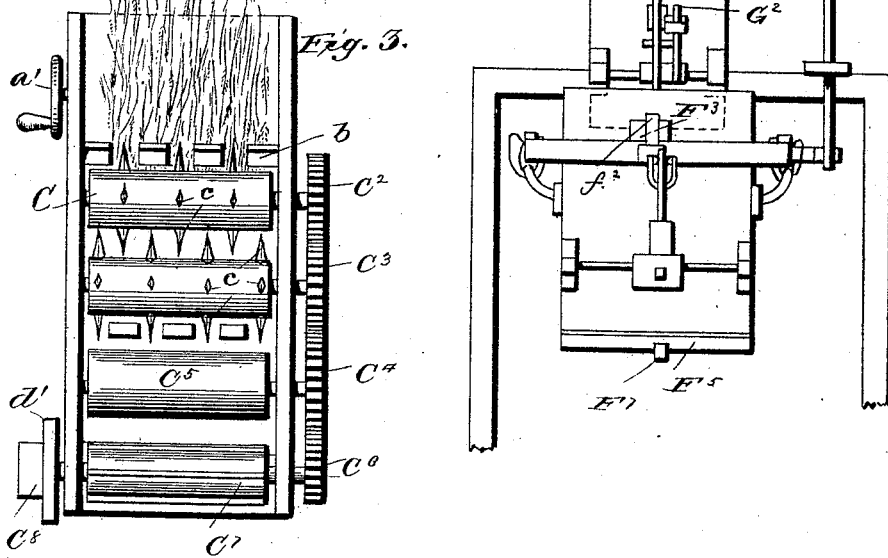

Figure 1 is a side view of my improved apparatus. Fig. 2 is an end view of the same. Fig. 3 is a plan of the feed rollers and racks. Fig. 4 is a side elevation on a larger scale of the weigh-box and grain-spout with the valve operating mechanism. Fig. 5 is a like view with the parts in their other position, that is, with the bottom of the weigh-box open and of the grain-spout closed.

Like letters and figures of reference refer to like parts in all the figures of the drawings.

Referring now to the details of the drawings by letter, A designates a portion of the supporting frame and B is a table or other support thereon having a slotted wall $b$ through which the teeth or hooks $c$ of the rolls C project. The table or support B is mounted in any suitable manner so as to be adjusted to any desired angle. I have shown one means of accomplishing this purpose. It consists of a shaft A' provided with a hand-wheel $a'$ by which it may be turned and a cam $a^2$ on said shaft and arranged beneath the bottom of the table. Any other means, however, may be provided for this purpose.

B' designates the hay which may be either loose or baled and which is placed upon the table B where it is acted upon by the hooks or teeth $c$ of the rollers C which latter are preferably mounted for rotation in opposite directions. The teeth or hooks of one roll work through the slots of the vertical portion of the table while those of the other work through the slots of the partition or rack $b'$. Any suitable means may be employed for giving motion to the rolls C. In Fig. 3 I have shown the shafts thereof as provided with gears $C^2$, and $C^3$, the latter of which meshes with the gear $C^4$ on the shaft of one of the feed rolls $C^5$ and the gear $C^4$ meshing with a gear $C^6$ on the shaft of the cutter $C^7$ which latter derives its motion from any suitable source as by belt, not shown, passing over the drive pulley $C^8$ thereon. The feed rollers $C^5$ as well as the cutter $C^7$ and its co-operating roller $C^9$ may be of any well known or appropriate construction.

$A^2$ is a dust-hood or cover over the feed rolls and cutter as seen in Figs. 1 and 2 and which communicates, by suitable duct or spout $a^3$, with a fan $A^3$, by means of which the dust and dirt are withdrawn from the machine and conducted to any suitable place of deposit.

D is a hopper into which the grain is discharged and from which it passes to the trough or box D' in which is arranged a spiral conveyer D² which is designed to receive its motion in any suitable manner, as for instance, by means of a belt not shown passed around the pulley $d$ on the shaft of the conveyer and around a like pulley $d'$ on the shaft of the cutter C⁷.

E is a mill of any suitable construction to which the mixed grain and chopped hay are delivered and by which the same is ground in any required degree of fineness. The mill is driven in any suitable manner from any source, as for instance by means of belts, not shown, passed around the pulleys $e$ on the shaft thereof. See Fig. 1.

F is the weigh-box or receptacle. It is suspended from the arms of the lever F' which is supported upon fulcrums $f$ on the frame F². It is provided with weights $f'$ which can be adjusted or changed to adapt the box or receptacle for different quantities or weights of fodder. F³ is a rolling weight on the lever 5 and adapted to travel between stops $f^2$ and $f^3$ on the said lever as seen best in Figs. 4 and 5. A stop $f^4$ is provided on the frame F² to limit the downward movement of the lever F'. To opposite sides of the box F are secured the brackets F⁴ as seen in Fig. 5 which serve to support the weights of the valve operating mechanism of the spout when the box F is in its uppermost position as seen in Fig. 4. This weight box or receptacle is provided with a valve or bottom F⁵ hinged at $f^5$ and counter-balanced by the weight F⁶ on the arm $f^6$. This valve or bottom is locked when in its closed position, as seen in Fig. 4, by engagement with the notch F⁷* of the latch F⁷ which is pivoted at $f^8$ to one side of the box and its other end normally held outward by means of a spring F⁸ secured to the side of the box and bearing against said latch as seen in Figs. 4 and 5. This latch serves to hold the valve or bottom of the box in its closed position during the filling of said box. When the box is filled and descends the upper end of the latch F⁷ strikes the pawl F⁹ which is pivoted at $f^9$ to the frame or support F² and thus forces the upper end of the latch inward against the tension of its spring and consequently throwing its lower end outward so as to disengage its notch from the free end of the valve or bottom of the box and allowing the latter to open into the position in which it is shown in Fig. 5. The pawl F⁹ is limited in its downward movement by a lug or stop $f^7$ on the frame F² and the upper end of the latch is rounded as seen in Fig. 5 to permit of its readily passing the pawl in the upward movement of the weight box or receptacle.

The mixed grain and cut hay are discharged from the mill into the spout G which is suitably supported from the frame and is provided with the hinge valves or bottom G' which are hinged at $g$ and are counterbalanced by arms G² and weights G³ as seen in Figs. 4 and 5. These arms are each provided with two pins $g'$ and $g^2$ which are adapted to engage notches or projections $h, h'$, in or on the latches H which are pivoted at $h^2$ to the sides of the spout and which are acted upon by the springs H' secured to the sides of the spout as seen in Figs. 4 and 5. The lower ends of these latches are provided with pins or projections $h^3$ which work in the elongated slots $h^4$ in the upper ends of the links or rods H², the lower ends of which carry weights H³ which, when the weight box F is in its uppermost position are supported upon the brackets F⁴ on the sides of said box as seen in Fig. 4, and when in this position the valves of the spout are open.

The amount of grain fed to the mill is governed by the measuring drum I which is mounted for rotation on a suitable shaft I' and which is provided with a plurality of compartments $i$. (See Fig. 1.) The grain is fed to the said drum through a spout 12 and from the drum to the hopper D through a chute or equivalent device $i'$. See Fig. 2.

J is a support to which is pivoted at $j$, the arm J' to which is pivotally connected the rod J² which is connected to the beam F' in the following manner: On said beam or lever is a pin $j'$ which works in a horizontally elongated slot $j^2$ at the lower end of said rod as seen in Figs. 4 and 5, the said rod passing through a guide J³ on the frame F².

L is a lever pivoted at $l$ to the support J and at one end carrying a depending rod L' the lower end of which carries the horizontally-projecting pawl L², with which the arm J' is designed to engage as the latter is moved in a manner hereinafter set forth. To the other end of the lever L is attached the depending arm L³ which is connected with the locking pawl L⁴, the hooked end of which is designed to engage the horizontally-projecting pin $l'$ on the end of the measuring drum I, as seen in Fig. 2. The arm L³ is also connected with pawl $l^2$ pivoted at $l^3$ and designed to engage a ratchet $l^4$ on the end of the measuring drum, the whole being held by the tension of a spring L⁵ as seen in Fig. 1.

With the parts constructed and arranged substantially as hereinbefore set forth, the operation is as follows: The hay is placed upon the table B and fed to the rollers C, the teeth or hooks of which catch into the same and feed it to the feed rolls C⁵, by which it is fed to the cutter C⁷ from which it drops into the trough D' and by the conveyer D² is conveyed to the inner end of said trough, where it is mixed with the grain from the hopper D and the cut hay and grain pass onto the mill E where the same is ground. From the mill the ground material passes to the spout G, the dust being automatically taken away from the machine by the fan through the hood A² and conduit $a^3$. During this operation the box or receptacle F is in its uppermost position as seen in Fig. 4, the weights H³ being supported upon the bracket F⁴ on said box and the valves at the bottom of the chute G open and the valve operating devices being in a position in which they are shown in said Fig. 4. The chopped hay and grain continue to fall into the box F until the weight thereof counterbalances that at the other end of the beam when the weight F³ rolls down the lever and the box descends into the position in which it is shown in Fig. 5. As the box descends the upper end of the latch F⁷ engages the pawl F⁹ and forces the upper end of said latch inward so as to disengage its lower end from the valve or bottom F⁵ of the box which automatically opens. This movement of the box withdraws the brackets F⁴ from beneath the weights H³ when the latter fall by reason of the loose connection of their upper ends with the latches H and said latches are drawn downward so that the pins g' are disengaged from the shoulders or notches h of the levers H which at once fall from the position in which they are shown in Fig. 4 to that in which they are shown in Fig. 5, closing the valve G' and the latches are locked in this position by the engagement of the pins g² with the notches or projections on the opposite sides of the latches as seen in Fig. 5. Now when the box F returns to its normal position the arm J' engages the pawl L² which actuates the lever L to lift the pawl L⁴ out of engagement with its pin on the measuring drum and at the same time actuates the pawl I² to move the ratchet one tooth and thus bring a new compartment of the measuring drum into position to be filled with grain and to bring the compartment which has already been filled into a position to be afterward emptied into the hopper. It will thus be seen that the hay is fed to the knives, is there cut, is taken by the conveyer to a position where it is mixed with the grain as it falls from the measuring drum and the two passed to the mill where it is ground and thence to the chute and then to the weight box or receptacle. When the amount of material in the box is sufficient to overcome the counterbalance the box is automatically relieved of its contents, the valves of the chute are closed, the measuring drum is actuated and then as the weight box returns to its normal position the valves of the chute are automatically opened and the same operation is repeated.

Modifications in detail may be resorted to without departing from the spirit of the invention or sacrificing any of its advantages.

The apparatus may be either stationary or portable as may be desired so that it may be readily transported from place to place to operate in the field or in a barn or other place.

What I claim is—

1. In a fodder preparing apparatus, the combination of a disintegrating apparatus, a grain supplying mechanism, a grinder arranged to receive material from the disintegrator and from the grain supplying mechanism simultaneously and a weighing receptacle in vertical line with the grinder, substantially as specified.

2. In a fodder preparing apparatus, the combination of a disintegrating mechanism, grain-feeding devices located upon a higher plane, a grinder arranged to receive simultaneously the material from the disintegrator and from the grain feeding devices and a weighing receptacle in vertical line with the grinder, substantially as specified.

3. In a fodder preparing apparatus, the combination of a disintegrating mechanism, grain-supplying devices upon a higher plane, a grinder located and arranged to receive simultaneously the material from the disintegrator and from the grain feeding devices, a weighing receptacle in vertical line with the grinder and operative connections, substantially as specified whereby the same are rendered automatic in their action, as set forth.

4. In a fodder preparing apparatus, the combination of a disintegrating mechanism, grain feeding devices, a grinder arranged to receive simultaneously material from the disintegrator and grain feeding devices, a conveyer interposed between the grinder and the disintegrator and feeding devices, and a suspended weighing receptacle operatively connected for automatic action and located and arranged to receive the material from the grinder, substantially as specified.

5. In a fodder-preparing apparatus, the combination of grain-supplying devices, an interposed grinder, a suspended weight receptacle in substantially vertical line with said grinder and an interposed chute with valves, all connected for con-joint automatic actuation, as set forth.

6. The combination with a disintegrating mechanism, of a grain supplying device a suspended weight box or receptacle and an interposed conveyer, grinding device, and chute with hinged valve, substantially as specified.

7. The combination with a disintegrating mechanism, of a grain-supplying device, a suspended weight box or receptacle and an interposed conveyer, a grinding device, and chute with hinged valve and operative connections between the same for rendering them automatic in their action, substantially as specified.

8. The combination with the grain-supplying drum, of a hopper beneath the same, disintegrating mechanism, a grinding mill and a conveyer for conveying the disintegrated material to be mixed with the grain before entering the mill, substantially as specified.

9. The combination with the grain measuring device of a hopper beneath the same, a mill beneath the hopper, a chute beneath the mill, a suspended receptacle below the chute and operative connections between the support of the receptacle and the measuring device, substantially as specified.

10. The combination with a grinding mill the counter-balance lever and the receptacle supported therefrom, of the measuring drum, its actuating devices and an interposed rod having limited loose connection with the counter-balance lever, substantially as specified.

11. The combination with a grinding mill the counter-balance lever and the receptacle supported therefrom, of the measuring drum, its actuating devices, an interposed rod having limited loose connection with the counter-balance lever and a shifting weight adapted to travel upon said lever, substantially as specified.

12. The combination with the counter-balance lever and the receptacle supported therefrom, of the chute above the receptacle, pivoted valves for said chute and valve-operating devices normally supported upon said receptacle, substantially as specified.

13. The combination with a grinding mill the counter-balance lever and the receptacle supported therefrom, of the chute above the receptacle, pivoted valves for said chute, counter-balance levers for said valves and valve-operating devices cooperating with said levers and normally supported by the receptacle, substantially as specified.

14. The combination with a grinding mill the counterbalance lever and the receptacle supported therefrom, of the hinged bottom to said receptacle, the pivoted latch for holding said bottom in its closed position, and the pivoted pawl arranged in the path of said latch, as set forth.

15. The combination with a grinding mill the counterbalance lever and the receptacle supported therefrom and having brackets on its sides, of the chute, its hinged valves and weighted levers, the pivoted latches cooperating with said levers, and the weights connected with the latches and normally supported by the brackets on the receptacle, as set forth.

16. The combination with a grinding mill the counter-balance lever and the receptacle, of the chute, its hinged valves and weighted levers, the pivoted latches cooperating with said levers and the rods carrying weights and having limited loose pivotal engagement with the latches, substantially as specified.

17. The combination with a grinding mill the chute and its pivoted valve with weighted levers having pins, of the pivoted latches having notches or projections to engage said pin and the rods carrying weights and having a limited loose connection with the latches, substantially as specified.

18. The combination with a grinding mill the chute and its pivoted valve with weighted levers having pins, of the pivoted latches having notches or projections to engage said pins and the rods carrying weights and having limited loose connection with the latches and a suspended receptacle having brackets to normally support said weights, substantially as specified.

19. The combination with a grinding mill a counter-balance lever and a receptacle supported thereon, of a measuring drum mounted for rotation, a rod connected with the lever and with a pivoted arm, a pawl mounted for engagement with said arm and intermediate pivotal connections between said pawl and drum, substantially as specified.

20. The combination with a grinding mill a counter-balance lever and a receptacle supported thereon, of a measuring drum having radial compartments and mounted for rotation, a rod connected with the lever and a pivoted arm, a pawl mounted for engagement with said arm and intermediate pivotal connections between said pawl and drum, substantially as specified.

21. The combination with a grinding mill the measuring drum mounted for rotation and provided with a ratchet and laterally-projecting pin, of a pawl mounted for engagement with said ratchet, an independent pawl for engagement with said pin, a movable receptacle, a rod mounted for actuation by the movement of the receptacle and intermediate-operative connections whereby the movement of said rod actuates the pawls, substantially as specified.

22. The combination with a grinding mill the measuring drum having radial compartments and mounted for rotation and provided with a ratchet and pins at one end, of independent pawls for engaging said pins and ratchet, a pivoted lever connected with said pawl, a pawl pendent from one end of said lever and a rod actuated by the movement of the receptacle and connected with a pivoted arm mounted for engagement with the pendent pawl, substantially as specified.

23. The combination with a grinding mill the measuring drum having ratchet and pins, of the counter-balance lever, the receptacle supported therefrom, the rod connected with said lever, the pivoted arm to which the other end of said rod is attached, the lever pivoted above the measuring drum, the pawl pendent from one end thereof in the path of the pivoted arm, the independent pawls for engagement with said ratchet and pins and the arm pendent from the other end of the lever and connected with and adapted to operate said pawls, substantially as specified.

In testimony whereof I affix my signature in presence of two witnesses.

ALBERT F. DAVIS.

Witnesses:
WALTER A. CLARK,
EDMOND G. MASON.